United States Patent [19]
Hull

[11] Patent Number: 5,919,046
[45] Date of Patent: Jul. 6, 1999

[54] HAZARD PERCEPTION TEST SYSTEM

[75] Inventor: Michael Alan Hull, Blackburn South, Australia

[73] Assignee: Roads Corporation, Victoria, Australia

[21] Appl. No.: 08/948,659

[22] PCT Filed: Jan. 13, 1994

[86] PCT No.: PCT/AU94/00018

§ 371 Date: Jun. 26, 1995

§ 102(e) Date: Jun. 26, 1995

[87] PCT Pub. No.: WO94/16423

PCT Pub. Date: Jul. 21, 1995

Related U.S. Application Data

[63] Continuation of application No. 08/481,253, filed as application No. PCT/AU94/00018, Jan. 13, 1994, abandoned.

[30] Foreign Application Priority Data

Jan. 13, 1993 [AU] Australia ............................. PL6776/93

[51] Int. Cl.$^6$ .................................................. G09B 19/00
[52] U.S. Cl. .......................... 434/258; 434/118; 434/305; 434/365; 434/307 R; 395/500; 340/576; 73/865.6
[58] Field of Search ..................................... 434/118, 219, 434/236, 258, 305, 307 R, 323, 362, 365, 366; 73/862.38, 865.3; 345/473, 121, 157, 161, 904; 364/528.39; 701/1, 117; 702/108, 142, 148; 463/1, 23; 340/425.5, 435, 436, 576; 395/500

[56] References Cited

U.S. PATENT DOCUMENTS

| 3,357,115 | 12/1967 | Kelley ....................................... 434/258 |
| 4,058,911 | 11/1977 | Story ........................................ 434/258 |
| 4,325,697 | 4/1982 | Regan et al. ............................. 434/258 |
| 4,750,888 | 6/1988 | Allard et al. . |
| 5,103,408 | 4/1992 | Greenberg et al. ................. 424/323 X |
| 5,338,206 | 8/1994 | Hupfer ..................................... 434/305 |
| 5,344,324 | 9/1994 | O'Donnell et al. ...................... 434/258 |
| 5,366,376 | 11/1994 | Copperman et al. ........... 434/307 R X |
| 5,551,880 | 9/1996 | Bonnstetter et al. .................... 434/236 |

FOREIGN PATENT DOCUMENTS

| 0 183 497 A1 | 6/1986 | European Pat. Off. . |
| 0 391 546 A3 | 10/1990 | European Pat. Off. . |
| 0 468 554 A2 | 1/1992 | European Pat. Off. . |
| WO93/24915 | 12/1993 | WIPO . |

*Primary Examiner*—Joe H. Cheng
*Attorney, Agent, or Firm*—Nixon & Vanderhye, P.C.

[57] ABSTRACT

A hazard perception test system comprising a CRT screen for displaying a sequence of images of a scene to be viewed by a test subject and in which at least one hazard appears, the images establishing a state of relative movement between the at least one hazard and the test subject, a computer for generating a select signal in response to an action by the subject, the select signal representing an image in the sequence selected by the subject as a point in the sequence at which to change the state, and for determining the ability of the subject to satisfactorily perceive hazards on the basis of the select signal.

17 Claims, 6 Drawing Sheets

HAZARD PERCEPTION TEST SYSTEM

This is a continuation of application Ser. No. 08/481,253, filed Jun. 26, 1995, now abandoned which is a national stage of PCT/AU94/00018 filed Jan. 13, 1994.

FIELD OF THE INVENTION

The present invention relates to a hazard perception test system.

BACKGROUND AND SUMMARY OF THE INVENTION

A system which can be used to predict and determine how a person will react when placed in a hazardous situation may be used to assess whether the person qualifies for a particular position or is able to perform a specific task. How the person reacts will depend on how a hazard is perceived. The ability to perceive and deal with a hazard satisfactorily whilst driving a vehicle is of particular interest to authorities which grant vehicle driving licences and companies asked to insure vehicles driven by the licence holder. While tests for the granting of a driving licence normally assess knowledge of basic driving skills and knowledge of traffic rules, little is done to assess whether a driver has sufficient capability to react satisfactorily in a hazardous situation to avoid vehicle damage or personal injury. An ability to test this capability could be used generally to assess driving performance, such as whether persons suffering certain medical conditions should be allowed to drive.

A system is desired which can assess and predict future driver behaviour in a number of hazardous situations. Ideally, the system would provide full simulation of vehicle driving conditions, and present a number of hazardous situations to a test subject, but such a system would be prohibitively expensive. Reducing the level of simulation reduces the cost but the system then needs to avoid a phenomenon known as simulation sickness which test subjects will suffer unless their stimula is carefully controlled. The system should take these factors into account and yet still be able to provide a satisfactory assessment of the person's hazard perception ability.

In accordance with the present invention there is provided a hazard perception test system comprising:

means for displaying a sequence of images of a scene to be viewed by a test subject and in which at least one hazard appears, said images establishing a state of relative movement between said at least one hazard and said subject;

means for generating a select signal in response to an action by said subject, said select signal representing an image in said sequence selected by said subject as a point in said sequence at which to change said state; and means for determining the ability of said subject to satisfactorily perceive hazards on the basis of said select signal.

Preferably said generating means generates an interrupt signal in response to said action by said subject and, in response to said interrupt signal, accesses image address data of said system and derives said select signal from said image address data.

The ability of said subject may be deemed to be satisfactory when the number of the selected image is within a predetermined range. Preferably said display means displays a plurality of different ones of said sequence, and a plurality of said select signal generated for the difference sequences, respectively, represent respective image numbers associated with each of the sequences, and said determining means thereby determines said ability is satisfactory when the sum of said image numbers is within a predetermined range or when the respective image numbers fall within respective predetermined ranges for a predetermined percentage of said sequences.

Advantageously said scene requires at least one perceptual component of a group of perceptual components to be exercised satisfactorily to negotiate said hazard, said group including perceptual components which when exercised unsatisfactorily contribute to the aetiology of accidents.

Advantageously the scene may be one normally viewed by the driver of a vehicle during a driving situation and said hazard is a driving hazard, such as an approaching vehicle, obstacle, bend, or a changing or approaching traffic signal.

BRIEF DESCRIPTION OF THE DRAWINGS

A preferred embodiment of the present invention is hereinafter described, by way of example only, with reference to the accompanying drawings, wherein.

DETAILED DESCRIPTION OF EXEMPLARY EMBODIMENT

Figure 1:
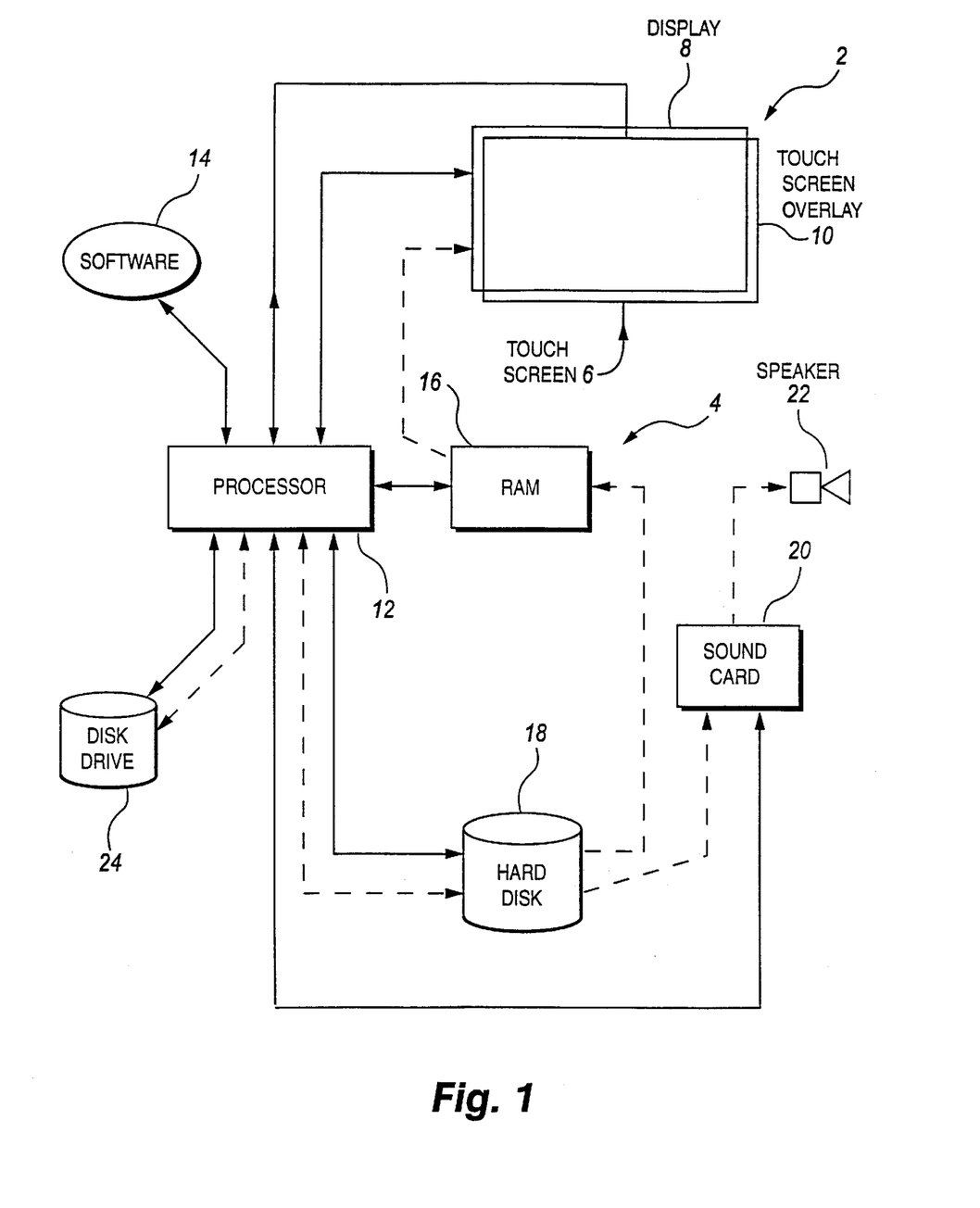
FIG. 1 is a block diagram of a preferred embodiment of a hazard perception test system.

A hazard perception test system 2, as shown in FIG. 1, comprises a personal computer 4, such as an IBM™ personal computer based on the Intel™ 80386 microprocessor and a touch screen 6, such as the Elodev™ touch screen. The touch screen 6 comprises a visual display monitor 8 fitted with a touch screen overlay 10. The overlay 10 provides an interrupt signal to the processor 12 of the computer 4 when pressed by a person's finger, and the screen 6 also generates signals representative of coordinates which specify the location of the point on the overlay 10 touched by a user. The computer 4 further includes controlling software 14, RAM 16, hard disk storage 18, a sound card 20 and speaker 22, and a disk drive 24 for removable storage disks. The computer may also be connected to a computer network for data communications. The solid lines in FIG. 1 illustrate control signal connections, whereas the dotted lines indicate data signal paths.

The system 2 displays on the touch screen 6, after generating appropriate visual and audio instructions, image sequences which each depict a scene that would normally be viewed by the driver of a vehicle in a particular situation. In the scene a hazard will appear, and the sequence will establish an illusory form of relative movement between the person viewing the touch screen 6 and the hazard. For instance, the hazard may appear to move towards, away from or across the front of the viewer who constitutes a test subject. The subject is instructed to touch the screen 6 when the subject feels it is an appropriate point in the sequence to change the state of the relative movement. The images are video images which are digitised and stored in the hard disk 18 and accessed by the processor 12 for display on the screen 6. For example, the scenes may present, as discussed in detail hereinafter, the view from the front of a car which is travelling at 60 kilometers towards a slower moving car or a group of cars beginning to stop at a traffic signal. The subject is therefore asked to touch the screen at the point which he feels he should begin to slow down.

Figure 2:
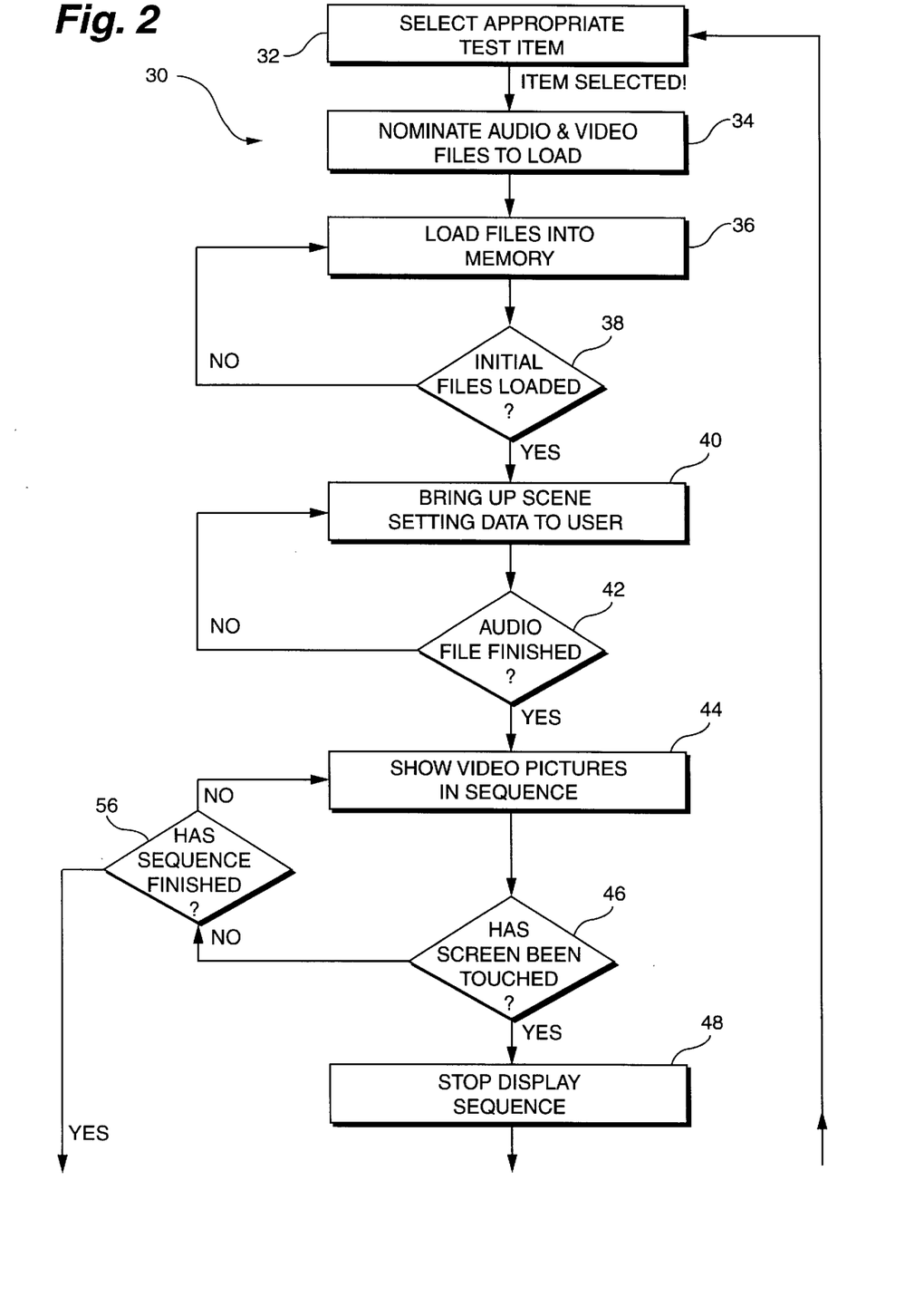
FIG. 2 is the first part of a flow chart for software of the system of FIG. 1.
Figure 3:
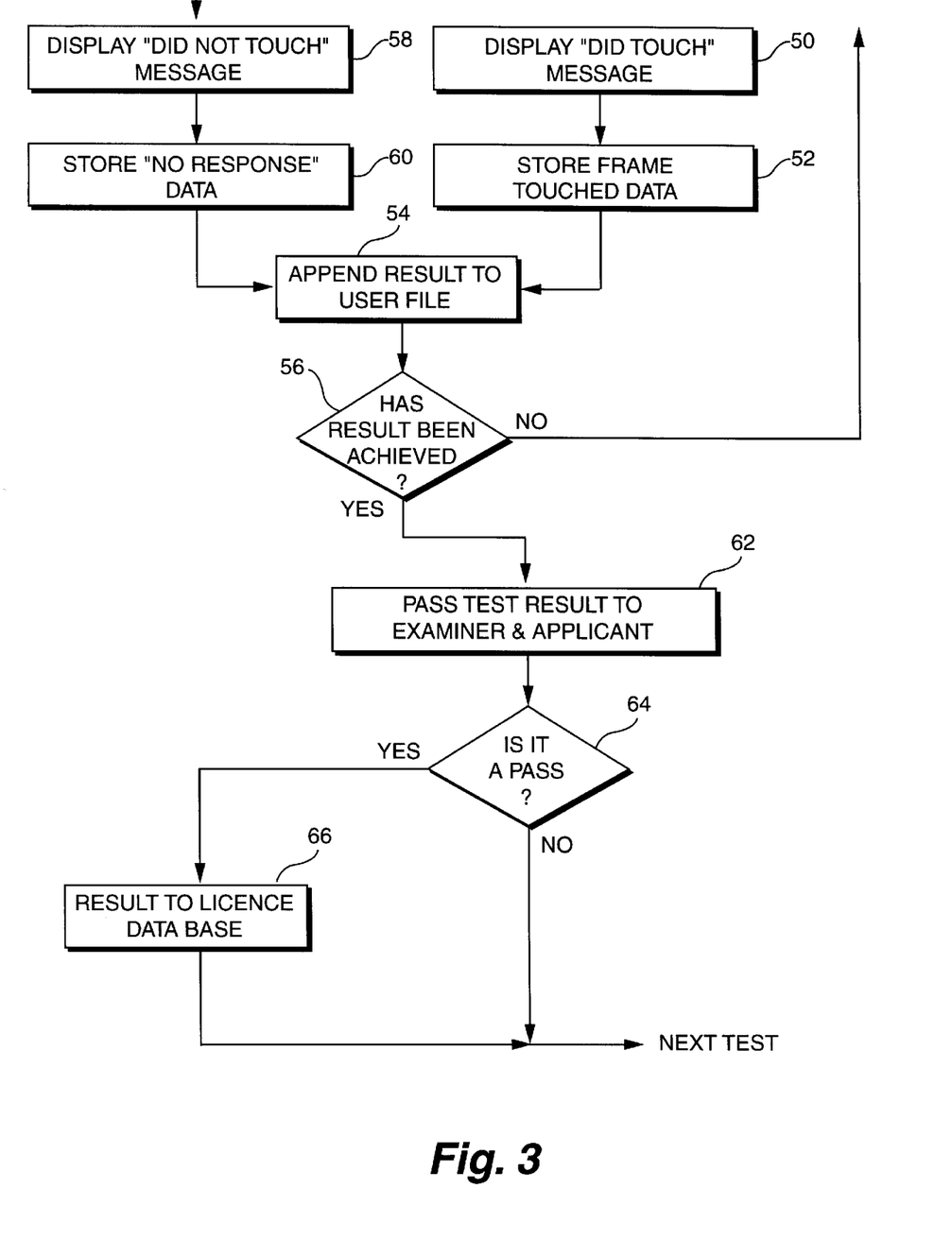
FIG. 3 is the second part of the software flow chart of FIG. 2.

A sequence of images which present a scene can be considered a test item and the software procedure 30 for selecting and displaying the test items is illustrated in FIGS. 2 and 3. The procedure begins at step 32 when a next test item in a sequence of test items is selected by the processor 12. The processor 12 designates the audio and video files for the test item at step 34 and then accesses the files at step 36 from the hard disk 18 and loads them into the RAM 16, which needs to have a capacity of 8 megabytes and is preferably 12 megabytes. Once the processor 12 determines that the files have been correctly loaded at step 38 the first image is accessed from the RAM 16 and displayed on the touch screen 6 at step 40, and the corresponding audio file sent to the sound card 20 and used to generate audio instructions on the speaker 20 which accompany the visual instructions provided in the initial image. When the processor determines at step 42 that the audio file has been completed, the sequence of images for the test item are accessed and displayed at step 44.

If the processor 12 receives an interrupt signal indicating the screen has been touched at step 46, display of the sequence is halted at step 48. The processor 12 may generate a touched display message at step 50 and then accesses the state of the memory pointer for the RAM 16. On the basis of the memory pointer data for the RAM 16 the processor 12 is able to determine at step 52 the number of the frame which corresponds to the video frame being displayed on the touch screen 6 when the test subject touched the screen 6. The frame number obtained is then stored on a file for the test subject at step 54.

If, the processor 12 reaches step 56 where display of the sequence has been completed but an interrupt signal has not been received, indicating that the screen has been touched, operation of the procedure 30 proceeds to step 58 where a "did not touch" message can be displayed and the processor 12, at step 60, appends no response data to the subject's file at step 54. The no response data may be a number which exceeds the number of frames in the sequence. After data has been added to the subject's file at step 54, the processor 12 checks the file at step 56 to determine whether a complete hazard perception test has been conducted, and if not operation returns to step 32 where another test item is selected. If the hazard perception test has been completed, the subject's file with the test results can be displayed or communicated to the test subject or an examiner at step 58. At step 60 the processor 12 processes the subject's file to determine whether the test has been passed or not.

A satisfactory result is obtained for each test item if the frame number at which the subject touches the screen 6 is within an acceptance range between a lower and an upper frame number corresponding to the sequence. In some sequences, the correct answer may be not to have altered the state of relative movement, and therefore the screen 6 should not be touched during the sequence. A pass result for the hazard perception test may be determined by adding all the frame numbers obtained for each sequence in the test and determining if the sum falls within a predetermined pass range. Alternatively, a pass may only be considered to have been achieved if a pass result is achieved for a selected percentage of the test items of the test. Following processing of the file at step 60, if a pass result is obtained for the hazard perception test, the result can be stored in a licence database, at step 62, for future reference, otherwise if a pass is not obtained, an indication can be generated by the system 2 to indicate that failure has occurred and another test must be taken on the system 2 in due course. A failure result may also be stored in the licence database.

The scenes of the test items are based on an analysis of vehicle crashes commonly involving novice drivers. The common crashes are analysed to determine the nature of perceptual components contributing to their aetiology. The perceptual components which may be assessed include peripheral vision, elevation and range of the subject's gaze, use and interpretation of the rear vision mirrors on a vehicle, priority selection between moving and stationary hazards, and priority selection between near and far hazards.

The scenes are recreated from data on crashes involving novices and include the following for motor cars:

(i) The subject is travelling at 60 km/h and is behind another vehicle moving at a slower speed. The subject must indicate when is the appropriate moment to begin slowing down.

(ii) The subject is approaching a bend at 60 km/h which has traffic signs to indicate the bend should be negotiated at 45 km/h. Again, the subject must indicate the appropriate moment to begin slowing down.

(iii) The subject is positioned to turn left into main carriageway. Initial view is in front of the subject's vehicle, then subsequent images display the view from the right hand side of the subject's vehicle down the carriageway so as to view oncoming traffic. The subject must indicate the appropriate moment to accelerate so as to enter the oncoming traffic.

(iv) The subject is travelling at 60 km/h and is approaching traffic which is stopping for a stationary tram. The subject must indicate the appropriate moment to begin slowing down.

(v) The subject is stopped at a T-junction and wishes to enter the main carriageway by turning right. The touch screen 6 generates a split screen display, the left screen showing the view from the left hand side of the subject's vehicle, the right hand screen showing the right hand view from the subject's vehicle. The subject must indicate the appropriate moment to accelerate to begin executing the right hand turn.

Figure 4:
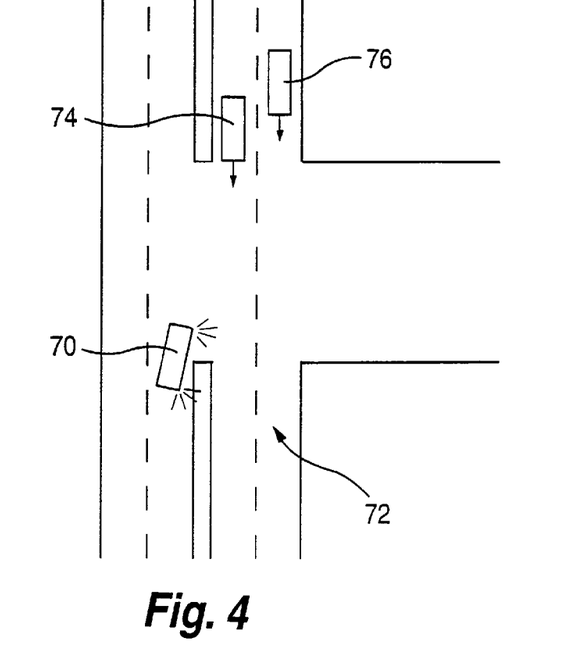
FIG. 4 is a schematic diagram of a first driving situation.

(vi) The subject is positioned, as shown in FIG. 4, to make a right hand turn in a car 17 across a dual carriageway 72. The subject must indicate when he feels it is safe to accelerate to begin execution of the right hand turn. A slow moving car 74 is travelling towards the subject in the right hand lane of the carriageway 72 and a fast moving car 76 initially obscured from the subject's view by the slower moving car 74, is travelling in the left hand lane.

Figure 5:
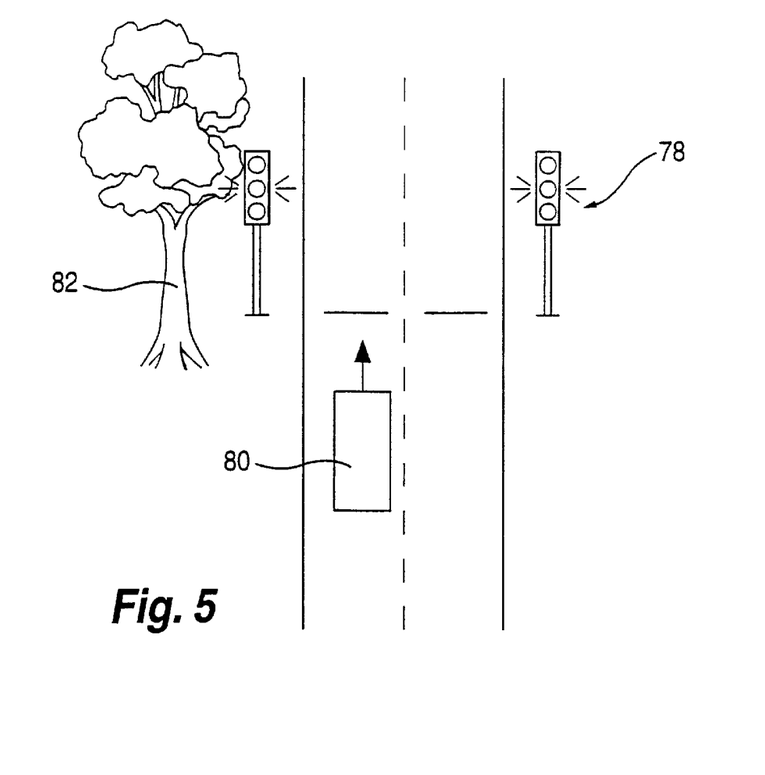
FIG. 5 is a schematic diagram of a second driving situation.

(vii) The subject is approaching a set of pedestrian traffic lights 78 in a car 80, as shown in FIG. 5, at 40 km/h. The subject must touch the screen 6 if he wishes to slow down at a point in the sequence. The lights 78 turn from green to yellow as the subject approaches the lights 78, and after they turn yellow a group of children run out across the pedestrian crossing from behind a tree 82 next to the crossing.

Figure 6:
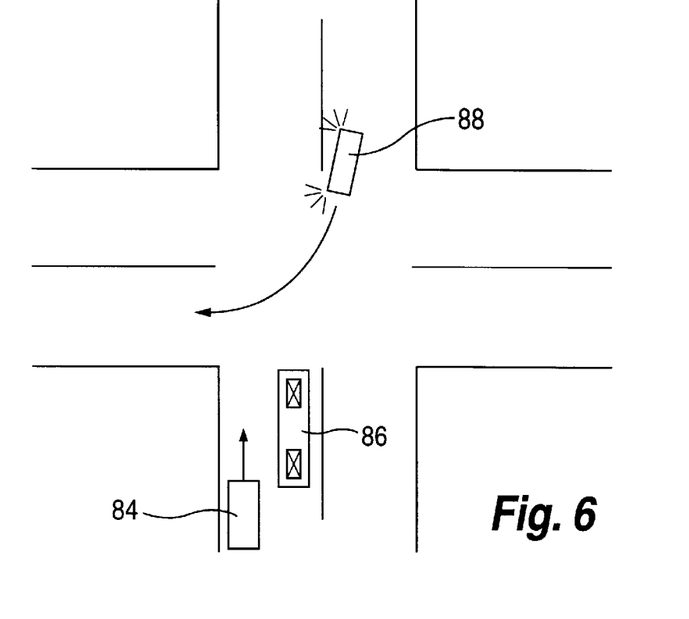
FIG. 6 is a schematic diagram of a third driving situation.

(viii) The subject is approaching an intersection at 40 km/h in a car 84, as shown in FIG. 6, at which a tram 86 is stationary in the right lane of the same carriageway as the subject's car 84. The subject must touch the screen 6 at the point he wishes to change speed so as to begin slowing down. As the subject approaches the tram 86 passengers alight from the tram. Alternatively, as the subject passes the tram 86 a car 88 travelling in the opposite direction and obscured by the tram 86 turns right in front of the subject.

Figure 7:
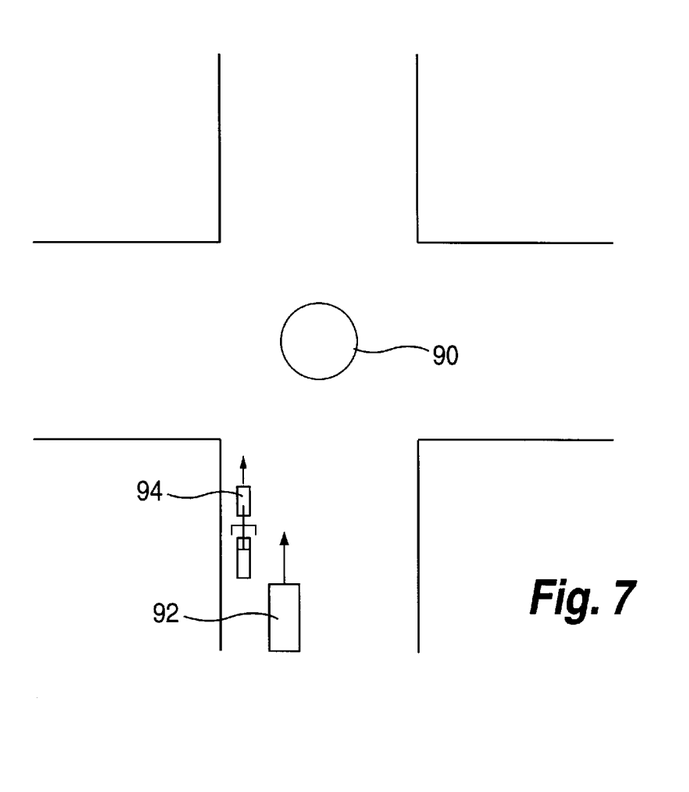
FIG. 7 is a schematic diagram of fourth driving situation.

(ix) The subject is approaching an intersection with a roundabout 90 in a car 92, as shown in FIG. 7, travelling at 40 km/h. A bicyclist 94 is travelling in the same direction ahead of the subject. The subject is asked to touch the screen 6 at the appropriate point when he feels it is safe to begin accelerating to overtake the bicyclist. Not enough distance is provided between the subject and the roundabout 90 to complete the overtaking manoeuvre and it is intended that the manoeuvre be completed after both the bicyclist 94 and the subject pass the roundabout 90.

Instructions for each test item are provided both visually in written form and orally in spoken form so as to attend to any difficulties the subject may have with one of the forms of communication. Different languages can also be selected. The test items are simple to execute as the subject only has to make one clear choice by touching or not touching the screen 6 at an appropriate time. The subject either answers the test items correctly or incorrectly, which has been found sufficient to provide a good prediction as to the subject's hazard perception ability, as discussed hereinafter, but of course the test items can be adjusted to allow for answers which are assigned, for example, a score out of 10 or 100.

Figure 8:
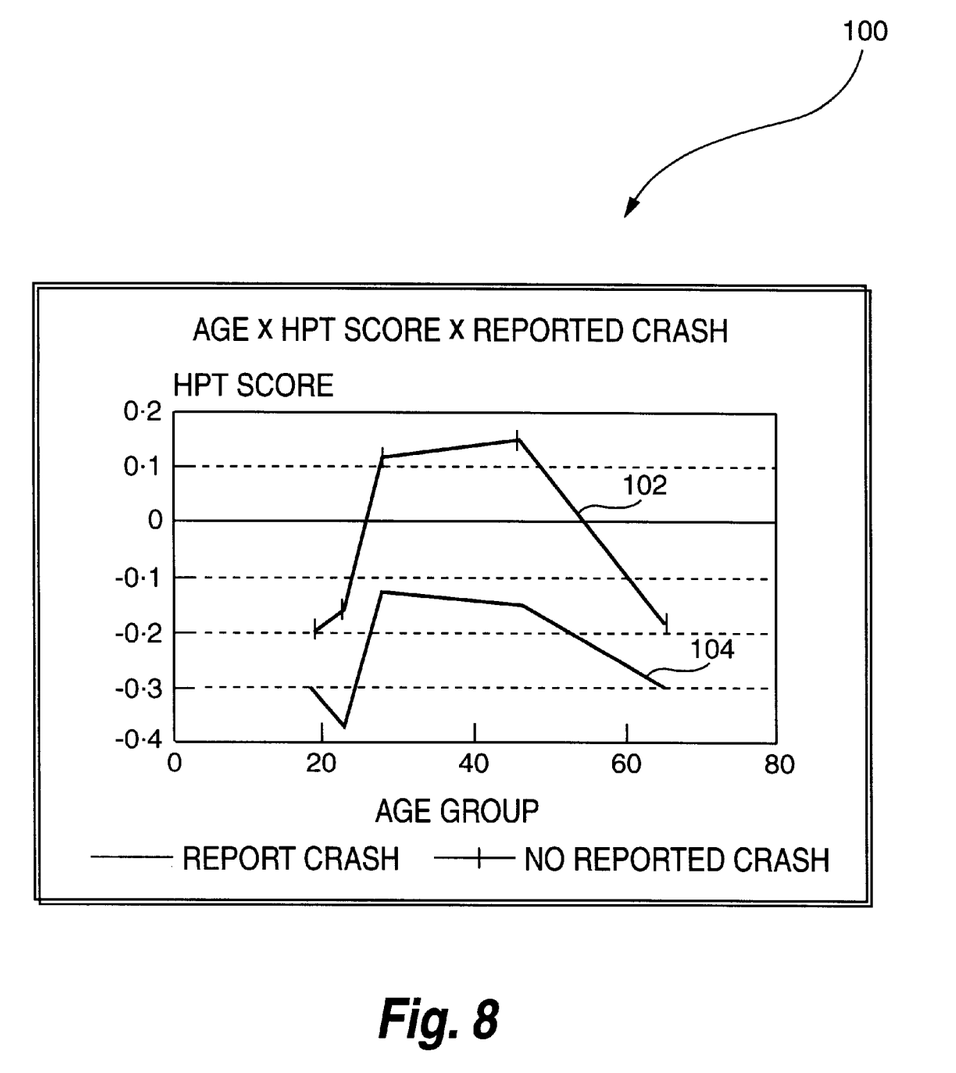
FIG. 8 is a graph of test scores produced by the system for different age groups of test subjects.

A trial of the hazard perception test system on a number of test subjects produced the results illustrated in the graph 100 of FIG. 8. The graph 100 has the age group of the subjects on the x axis and the normalised hazard perception test score obtained on the system 2 by members of an age group on the y axis. Two plots arc shown, the first 102 being for test subjects which have not been involved in a reported crash and the second plot 104 being for test subjects which have been involved in a reported vehicle crash. Data obtained independently on reported crashes indicates that most involved young drivers with little experience or elderly drivers whose abilities may have deteriorated. The hazard perception test results produced by the system 2 correspond to the independent data as drivers in the 25–55 age group obtained a relatively good score, as shown in the plot 102, whereas drivers outside that age group range obtained a relatively poor score. Plot 104 indicates that subjects which have been involved in reported crashes obtained even poorer scores.

The graph 100 illustrates that the hazard perception test system 2 is able to discriminate between less experienced and more experienced drivers, which in the past has been shown to be a function of age, and also discriminate between those who have been involved in crashes and those who have not. A test result obtained by a test subject on the hazard perception test system 2 gives an indication as to hazard perception ability and the future driver behaviour of the subject, which can be used by licence testing authorities and vehicle insurance companies. In particular, the system 2 may be used for the training and licensing of drivers of motorcycles, cars, heavy vehicles, trains, boats and aircraft. The system 2 could also be adjusted to deal with perception of a wide variety of hazards encountered in various situations and environments, where there is relative movement between a hazard and a test subject, in addition to that associated with driving a vehicle.

I claim:

1. A hazard perception test system comprising:
   means for displaying a selected sequence of images of a scene to be viewed by a test subject and in which at least one hazard appears, said images establishing a state of relative movement between said at least one hazard and said test subject;
   means for generating a single select signal in response to a single input from said test subject, said select signal representing an image in said sequence selected by said test subject as a point in said sequence at which to change said state, said input being binary in nature and said sequence of images not being altered by said input; and
   means for determining the ability of said test subject to satisfactorily perceive hazards on the basis of said select signal, said determining means determining said ability is satisfactory when said select signal represents an image within a predetermined group of said sequence of images.

2. A hazard perception test system as claimed in claim 1, wherein said generating means generates an interrupt signal in response to said action by said test subject and, in response to said interrupt signal, accesses image address data of said system and derives said select signal from said image address data.

3. A hazard perception test system as claimed in claim 1, wherein said select signal represents an image number associated with said sequence, and said determining means determines said ability is satisfactory when said number is within a predetermined range.

4. A hazard perception test system as claimed in claim 1, wherein said display means displays a plurality of different ones of said sequence, and a plurality of said select signal generated for the difference sequences, respectively, represent respective image numbers associated with each of the sequences, and said determining means thereby determines said ability is satisfactory when the sum of said image numbers is within a predetermined range.

5. A hazard perception test system as claimed in claim 1, wherein said display means displays a plurality of different ones of said sequence, and a plurality of said select signal generated for the difference sequences, respectively, represent respective image numbers associated with each of the sequences, and said determining means thereby determines said ability is satisfactory when the respective image numbers fall within respective predetermined ranges for a predetermined percentage of said sequences.

6. A hazard perception test system as claimed in claim 1, wherein said scene requires at least one perceptual component of a group of perceptual components to be exercised satisfactorily to negotiate said hazard, said group including perceptual components which when exercised unsatisfactorily contribute to the aetiology of accidents.

7. A hazard perception test system as claimed in claim 6, wherein said scent corresponds to that viewed by the driver of a vehicle during a driving situation and said hazard is a driving hazard.

8. A hazard perception test system as claimed in claim 7, wherein said driving hazard is an approaching vehicle.

9. A hazard perception test system as claimed in claim 7, wherein said driving hazard is an obstacle.

10. A hazard perception test system as claimed in claim 7, wherein said driving hazard is a bend.

11. A hazard perception test system as claimed in claim 7, wherein said driving hazard is a changing traffic signal.

12. A hazard perception test system as claimed in claim 7, wherein said driving hazard is an approaching traffic signal.

13. In a computer system having a processor coupled to at least one memory device and a display, a method for testing a test subject's perception of hazards comprising the steps of:

displaying a selected sequence of images of a scene to be viewed by a test subject and in which at least one hazard appears, said images establishing a state of relative movement between said at least one hazard and said test subject;

generating a single select signal in response to a single input from said test subject, said select signal representing an image in said sequence selected by said test subject as a point in said sequence at which to change said state, said input being binary in nature and said sequence of images not being altered by said input; and determining the ability of said test subject to satisfactorily perceive hazards on the basis of said select signals, said ability being determined to be satisfactory when said select signal represents an image within a predetermined group of said sequence of images.

14. The method of claim 13 further comprising the steps of:

generating an interrupt signal in response to said action by said test subject and, in response to said generating of said interrupt signal, accessing image data from said at least one memory device and deriving said select signal from said image data.

15. The method of claim 13 further comprising the step of determining said ability to perceive hazards is satisfactory when said select signal represents an image number within a predetermined range, said image number being associated with said sequence of images.

16. The method of claim 13 further comprising the steps of:

displaying a plurality of different ones of said sequence, generating a plurality of said select signal for said different ones of said sequence, respectively, representing respective image numbers associated with each of the sequences, and determining said ability is satisfactory when the sum of said image numbers is within a predetermined range.

17. The method of claim 13 further comprising the steps of:

displaying a plurality of different ones of said sequence, generating a plurality of said select signals for the different sequences, respectively, representing respective image numbers associated with each of the sequences, and determining said ability is satisfactory when the respective image numbers fall within respective predetermined ranges for a predetermined percentage of said sequences.

* * * * *